US012729057B2

(12) United States Patent
Fraas et al.

(10) Patent No.: US 12,729,057 B2
(45) Date of Patent: Sep. 8, 2026

(54) BI-STABLE BAND ACTUATOR

(71) Applicant: The Heil Co., Chattanooga, TN (US)

(72) Inventors: Mark Fraas, Centre, AL (US); Phillip Kendrick, Statham, GA (US)

(73) Assignee: The Heil Co., Chattanooga, TN (US)

( * ) Notice: Subject to any disclaimer, the term of this patent is extended or adjusted under 35 U.S.C. 154(b) by 365 days.

(21) Appl. No.: 18/477,356

(22) Filed: Sep. 28, 2023

(65) Prior Publication Data

US 2024/0124223 A1 Apr. 18, 2024

Related U.S. Application Data

(60) Provisional application No. 63/379,397, filed on Oct. 13, 2022.

(51) Int. Cl.
*B66F 3/02* (2006.01)
*B65F 3/02* (2006.01)

(52) U.S. Cl.
CPC ........ *B65F 3/02* (2013.01); *B65F 2003/0266* (2013.01); *B65F 2003/0269* (2013.01)

(58) Field of Classification Search
CPC ................ B65F 3/02; B65F 2003/0266; B65F 2003/0276; B65F 2003/0269; B65F 2003/023; F16H 19/064; F16L 9/17
USPC ........... 52/108; 138/119, 151, 137, 128, 140
See application file for complete search history.

(56) References Cited

U.S. PATENT DOCUMENTS 3,589,632 A * 6/1971 Rew ...................... F16H 19/064 436/805
6,256,938 B1 7/2001 Daton-Lovett
6,269,763 B1 8/2001 Woodland
6,966,448 B1 * 11/2005 Burkett ..................... E02D 7/18 212/231
11,761,207 B2 * 9/2023 Fernandez ........... B64G 1/2225 52/108

(Continued)

FOREIGN PATENT DOCUMENTS

EP 1236643 A2 9/2002
WO WO 1997035706 A1 10/1997

(Continued)

OTHER PUBLICATIONS

Sickinger et al., "Structural Engineering on Deployable Cfrp Booms for a Solar Propelled Sailcraft," Poster, Presented at the 54th International Astronautical Congress of the International Astronautical Federation, the International Academy of Astronautics, and the International Institute of Space Law, Bremen, Germany, Sep. 29-Oct. 3, 2003, 2015; American Institute of Aeronautics and Astronautics, Inc, downloaded from the University of Adelaide, 2003, IAC-03-I.4.05, 11 pages.

*Primary Examiner* — Glenn F Myers
(74) *Attorney, Agent, or Firm* — Fish & Richardson P.C.

(57) ABSTRACT

A front-loading refuse vehicle includes: a chassis; a cab coupled to a portion of the chassis, a hopper coupled to the chassis of the cab, and an arm assembly configured to move a refuse container from a location on one side of the refuse collection vehicle. The arm assembly includes a refuse container holder and a boom configured to move the refuse container holder relative to the chassis between an extended position and a retracted position. The boom includes a band including a bistable material reversibly configurable between a stowed configuration and a deployed configuration.

20 Claims, 8 Drawing Sheets

(56) References Cited

U.S. PATENT DOCUMENTS

| | | | | |
|---|---|---|---|---|
| 12,024,315 | B2 * | 7/2024 | Murphey | B64G 1/2229 |
| 2002/0116877 | A1 | 8/2002 | Breitbach et al. | |
| 2015/0259911 | A1 * | 9/2015 | Freebury | E04H 12/18<br>52/108 |
| 2016/0160553 | A1 * | 6/2016 | Nania | E05F 15/627<br>296/50 |
| 2017/0057743 | A1 * | 3/2017 | Steege | B65F 3/208 |
| 2017/0298628 | A1 * | 10/2017 | Rakow | B64G 1/2229 |
| 2021/0122568 | A1 * | 4/2021 | Boivin | B65F 3/08 |
| 2022/0212850 | A1 * | 7/2022 | Stringer | E05D 11/1007 |

FOREIGN PATENT DOCUMENTS

| | | | |
|---|---|---|---|
| WO | WO 1999062811 | A1 | 12/1999 |
| WO | WO 1999062812 | A1 | 12/1999 |

* cited by examiner

BI-STABLE BAND ACTUATOR

CROSS-REFERENCE TO RELATED APPLICATION

This application claims the benefit under 35 U.S.C. § 119(e) of U.S. Patent Application No. 63/379,397, entitled "Refuse Collection Vehicle with Bistable Band Actuator," filed Oct. 13, 2022, which is incorporated herein by reference in its entirety.

TECHNICAL FIELD

This disclosure generally relates to linear actuators, and more particularly to an arm assembly featuring linear actuators that include a bistable band.

BACKGROUND

Various types of refuse collection vehicles exist in the art. These vehicles can include different types of arm assemblies. The arm assemblies typically include telescoping booms that enable the arm to move from a pick-up position for picking up a refuse container at street level to a dump position for dumping the refuse in a hopper of the refuse vehicle. Telescoping booms often include one or more actuators (e.g., hydraulic actuators) and various types of linkages that move the arm from one position to another. Thus, current arm assembly designs can be complex, costly, and may require extensive maintenance. While current arm assemblies work reasonably well, improvements in their design and configuration are continually sought.

SUMMARY

This disclosure generally relates to linear actuators, and more particularly to refuse collection vehicles featuring a retractable arm assembly including a bistable band actuator.

One aspect of the present disclosure features a refuse collection vehicle including: a chassis; a cab coupled to a first portion of the chassis; a hopper coupled to a second portion of the chassis; and an arm assembly configured to move a refuse container from a location on one side of the refuse collection vehicle, the arm assembly including a refuse container holder and a boom configured to move the refuse container holder relative to the chassis between an extended position and a retracted position, the boom including: a band including a bistable material reversibly configurable between a stowed configuration and a deployed configuration, wherein at least a portion of the band is in the deployed configuration when the refuse container holder is moved to the extended position by the boom.

In some embodiments, the boom further comprises a drive box rotatably mounted within the arm assembly, the drive box configured to windably receive the band.

In some embodiments, the drive box comprises a free-rotating spool or a driven spool.

In some embodiments, the driven spool is an electrically-driven spool or a hydraulically-driven spool.

In some embodiments, the boom further comprises one or more drive rollers configured to extend and retract the band relative to the refuse collection vehicle, thereby causing the band to change from the stowed configuration to the deployed configuration.

In some embodiments, the arm assembly further comprises a motor operatively coupled to the one or more drive rollers, the motor configured to drive the one or more drive rollers.

In some embodiments, the motor is an electric motor.

In some embodiments, the motor is a hydraulic motor.

In some embodiments, the motor is operatively coupled and configured to drive a drive box rotatably mounted within the arm assembly, the drive box configured to windably receive the band.

In some embodiments, the boom further comprises one or more guide rollers configured to contact and maintain the band in the deployed configuration.

In some embodiments, the one or more guide rollers have a concave shape.

In some embodiments, the band is coiled when in the stowed configuration, and wherein the band is uncoiled when in the deployed configuration.

In some embodiments, the boom supports a load having a weight ranging from about 500 pounds (lbs.) to about 1,500 lbs.

In some embodiments, the band has a length and a width, wherein the band, while in the stowed configuration, is in a flattened form along the width.

In some embodiments, the band has a length and a width, wherein the band, while in the deployed configuration, is in a curved form along the width.

In some embodiments, the refuse collection vehicle further includes one or more additional bands.

In some embodiments, the band is a first band, and the one or more additional bands overlap the first band.

In some embodiments, the one or more additional bands have a length and a width, and, while in a deployed configuration, are in a curved form along the width, wherein the curved form of the one or more additional bands has an opposite curvature compared to a curvature of the curved form of the first band when in the deployed configuration.

In some embodiments, the boom further comprises a connector secured to a distal end of the band, the connector configured to connect the band to the refuse container holder.

In some embodiments, the refuse container holder is a grabber.

In some embodiments, the refuse container holder is a tipper, a hook, or an articulated arm.

Another aspect of the present disclosure features an arm assembly for a refuse collection vehicle, the arm assembly including: a refuse container holder; and a boom configured to move the refuse container holder relative to the refuse collection vehicle between an extended position and a retracted position, the boom including: a band including a bistable material reversibly configurable between a stowed configuration and a deployed configuration, wherein at least a portion of the band is in the deployed configuration when the refuse container holder is moved to the extended position by the boom.

In some embodiments, arm assembly is configured to move a refuse container from a location on one side of the refuse collection vehicle.

In some embodiments, the boom further comprises a drive box rotatably mounted within the arm assembly, the drive box configured to windably receive the band.

In some embodiments, the drive box is secured to the refuse container holder and positioned distally with respect to the refuse collection vehicle, and wherein the band is coupled to a side of the refuse collection vehicle.

In some embodiments, the drive box comprises a free-rotating spool or a driven spool.

In some embodiments, the driven spool is an electrically-driven spool or a hydraulically-driven spool.

In some embodiments, the boom further comprises one or more drive rollers configured to extend and retract the band relative to the refuse collection vehicle, thereby causing the band to change from the stowed configuration to the deployed configuration.

In some embodiments, the arm assembly further includes a motor operatively coupled to the one or more drive rollers, the motor configured to drive the one or more drive rollers.

In some embodiments, the motor is an electric motor.

In some embodiments, the motor is a hydraulic motor.

In some embodiments, the motor is operatively coupled and configured to drive a drive box rotatably mounted within the arm assembly, the drive box configured to windably receive the band.

In some embodiments, the boom further comprises one or more guide rollers configured to contact and maintain the band in the deployed configuration.

In some embodiments, the one or more guide rollers have a concave shape.

In some embodiments, the band is coiled when in the stowed configuration, and wherein the band is uncoiled when in the deployed configuration.

In some embodiments, the boom supports a load having a weight ranging from about 500 lbs. to about 1,500 lbs.

In some embodiments, the band has a length and a width, wherein the band, while in the stowed configuration, is in a flattened form along the width.

In some embodiments, the band has a length and a width, wherein the band, while in the deployed configuration, is in a curved form along the width.

In some embodiments, the arm assembly further includes one or more additional bands.

In some embodiments, the band is a first band, and the one or more additional bands overlap the first band.

In some embodiments, the one or more additional bands have a length and a width, and, while in a deployed configuration, are in a curved form along the width, wherein the curved form of the one or more additional bands has an opposite curvature compared to a curvature of the curved form of the first band when in the deployed configuration.

In some embodiments, the boom further comprises a connector secured to a distal end of the band, the connector configured to connect the band to the refuse container holder.

In some embodiments, the refuse container holder is a grabber.

In some embodiments, the refuse container holder is a tipper, a hook, or an articulated arm.

Another aspect of the present disclosure features an arm assembly for a refuse collection vehicle, the arm assembly including: a refuse container holder; a boom configured to move the refuse container holder relative to the refuse collection vehicle between an extended position and a retracted position, the boom including: a band including a bistable material reversibly configurable between a stowed configuration and a deployed configuration, wherein at least a portion of the band is in the deployed configuration when the refuse container holder is moved to the extended position by the boom; and one or more drive rollers configured to linearly extend and retract the band relative to the refuse collection vehicle, thereby causing the band to change from the stowed configuration to the deployed configuration.

Yet another aspect of the present disclosure features an arm assembly for a refuse collection vehicle, the arm assembly including: a refuse container holder; a boom configured to move the refuse container holder relative to the refuse collection vehicle between an extended position and a retracted position, the boom including: a band including a bistable material reversibly configurable between a stowed configuration and a deployed configuration, wherein at least a portion of the band is in the deployed configuration when the refuse container holder is moved to the extended position by the boom; and one or more guide rollers configured to contact and maintain the band in the deployed configuration.

Another aspect of the present disclosure features a band actuator, including: a band including a bistable material reversibly configurable between a coiled configuration and an uncoiled configuration, the band having a length and a width, wherein the band, while in the coiled configuration, is in a flattened form along the width, and while in the uncoiled configuration, is in a curved form along the width; a drive box rotatably mounted within the band actuator, the drive box configured to windably receive the band; one or more drive rollers configured to linearly extend and retract the band relative to the drive box, thereby causing the band to change from the coiled configuration to the uncoiled configuration; and one or more guide rollers configured to contact and maintain the band in the curved form along the width while in the uncoiled configuration.

Yet another aspect of the present disclosure features a refuse collection vehicle including: a chassis; a cab coupled to a first portion of the chassis; a hopper coupled to a second portion of the chassis; a hopper cover configured to cover an opening of the hopper; and a bistable band assembly configured to move the hopper cover between an open position and a closed position, the bistable band assembly including a band including a bistable material reversibly configurable between a stowed configuration and a deployed configuration.

In some embodiments, at least a portion of the band is in the deployed configuration when the hopper cover is moved to the closed position by the bistable band assembly.

In some embodiments, at least a portion of the band is in the deployed configuration when the hopper cover is moved to the open position by the bistable band assembly.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
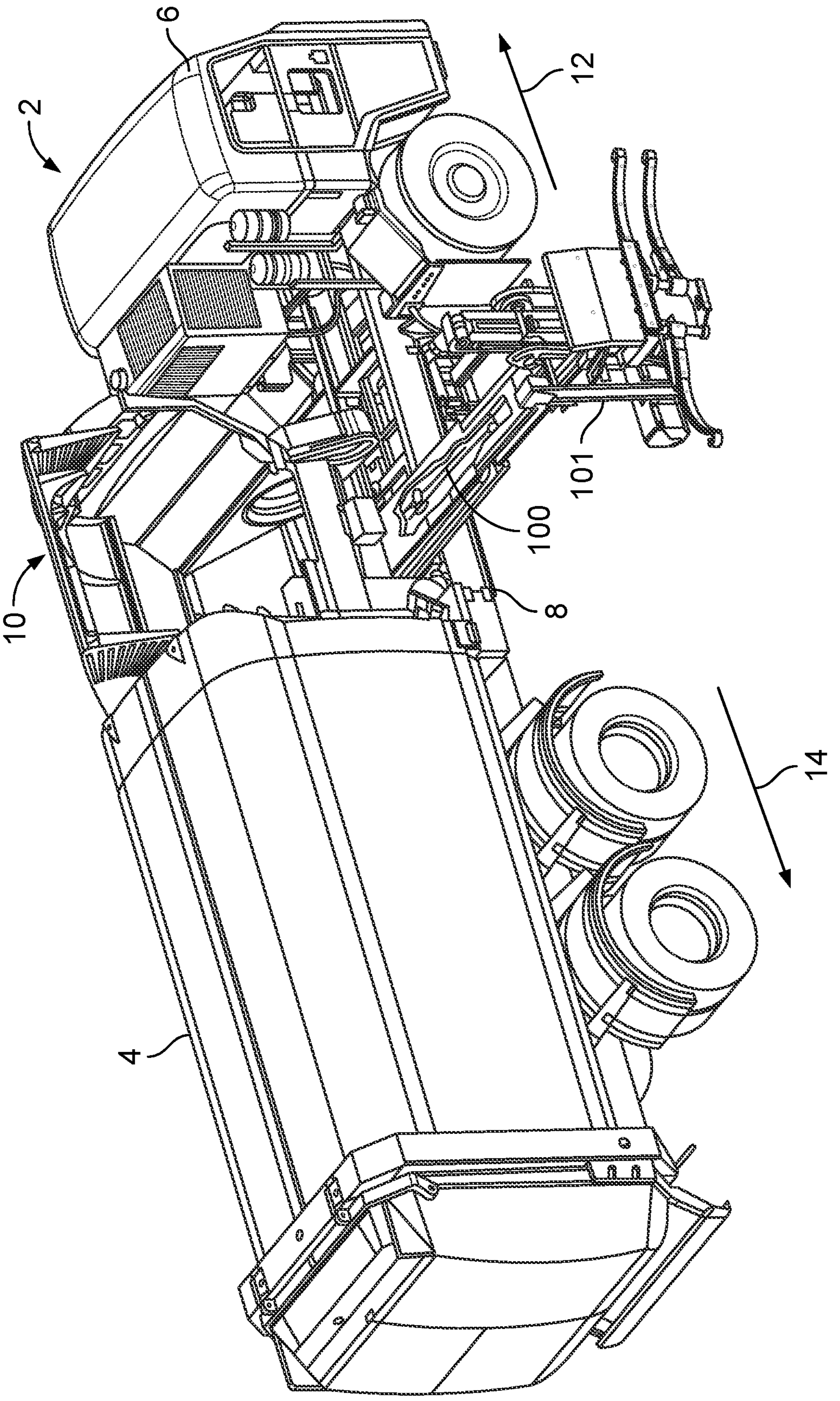
FIG. 1A is a perspective view of a refuse vehicle including an example arm assembly.

Embodiments described below include refuse collection vehicles featuring linear actuators designed to extend and retract through a retractable movement of a bistable band. In some embodiments, a distinct advantage of the bistable band linear actuators disclosed herein is their simpler design as compared to conventional actuators, such as "push chain" actuators, electric linear actuators, chain drive actuators, rack-and-pinion actuators, and telescopic actuators. The linear actuators of this disclosure feature lightweight materials, such as a bistable band, and excludes complex and costly mechanical and electronic components. The use of the lightweight bistable materials may reduce manufacturing costs, maintenance costs, and the amount of energy (e.g., fuel) required to operate the linear actuators of the disclosure as compared to conventional actuators. For example, "push chain" actuators can be heavy (e.g., weighing several hundred pounds), expensive, and complicated to maintain. On the other hand, the linear actuators of this disclosure may weigh less than comparable conventional actuators (e.g., conventional actuators having similar stroke length). Furthermore, electric linear actuators require costly electronic components and can cost several thousand dollars to manufacture, whereas the linear actuators consistent with this disclosure may be manufactured for a fraction of that cost. Telescopic actuators can also have reliability challenges, such as leaks and failures due to mechanical wear, seal wear, and/or lack of maintenance. The linear actuators consistent with embodiments of the present disclosure may require less maintenance over the lifetime of the actuator and, thus, may be more durable and reliable than conventional linear actuators, such as telescopic actuators. For example, the linear actuators described herein may be so inexpensive as compared to conventional linear actuators that even if yearly replacement of the linear actuators of the disclosure would be required, this cost would likely be less than the average yearly maintenance cost of a conventional linear actuator. Furthermore, the linear actuators described herein may have increased damage tolerance as compared to conventional actuators.

In some embodiments, an additional advantage of the linear actuators described herein is their ability to have an increased extension length as compared to conventional actuators. Conventional actuators can have a limited extension length. The size, including the extension length, of conventional actuators may be limited by the size of required components, such as hydraulic cylinders. For example, a conventional hydraulic actuator is limited to an extension length of about 8 feet due to the limitations of the size of the hydraulic cylinder. A linear actuator consistent with this disclosure may only be limited by the length of the bistable band material, which can be readily stowed into a compact configuration. Thus, the linear actuators within the scope of this disclosure may enable arm assemblies, for example, to reach refuse containers in positions that would be inaccessible to arm assemblies using conventional linear actuators.

FIG. 1A depicts a perspective view of an example side-loading refuse collection vehicle 2 in accordance with one or more embodiments of the present disclosure. Side-loading refuse collection vehicle 2 defines opposite forward 12 and rearward 14 directions of travel. Side-loading refuse collection vehicle 2 includes a cab 6, a hopper 10, and a body 4. The cab 6 is coupled to a first portion of a chassis 8. The hopper 10 is coupled to a second portion of the chassis 8. Body 4 is coupled to the chassis 8 rearward of the hopper 10. Hopper 10 is a front part of body 4 that serves as a loading chamber for the refuse. Refuse dumped into the side-loading refuse collection vehicle 2 falls inside hopper 10 where it stays until the side-loading refuse collection vehicle operator compacts the load into body 4 with a packer or eject panel. Body 4 then stores compacted refuse until the load is disposed of at a landfill, for example. Side-loading refuse collection vehicle 2 further includes an arm assembly 100 configured to extend and retract relative to a side of the side-loading refuse vehicle 2 (e.g., relative to the hopper 10). The arm assembly 100 is coupled to a refuse container holder 101 that is configured to grasp a refuse container from a location on one side of the side-loading refuse collection vehicle 2 and can be configured to dump refuse from the refuse container into the hopper 10.

Figure 1B:
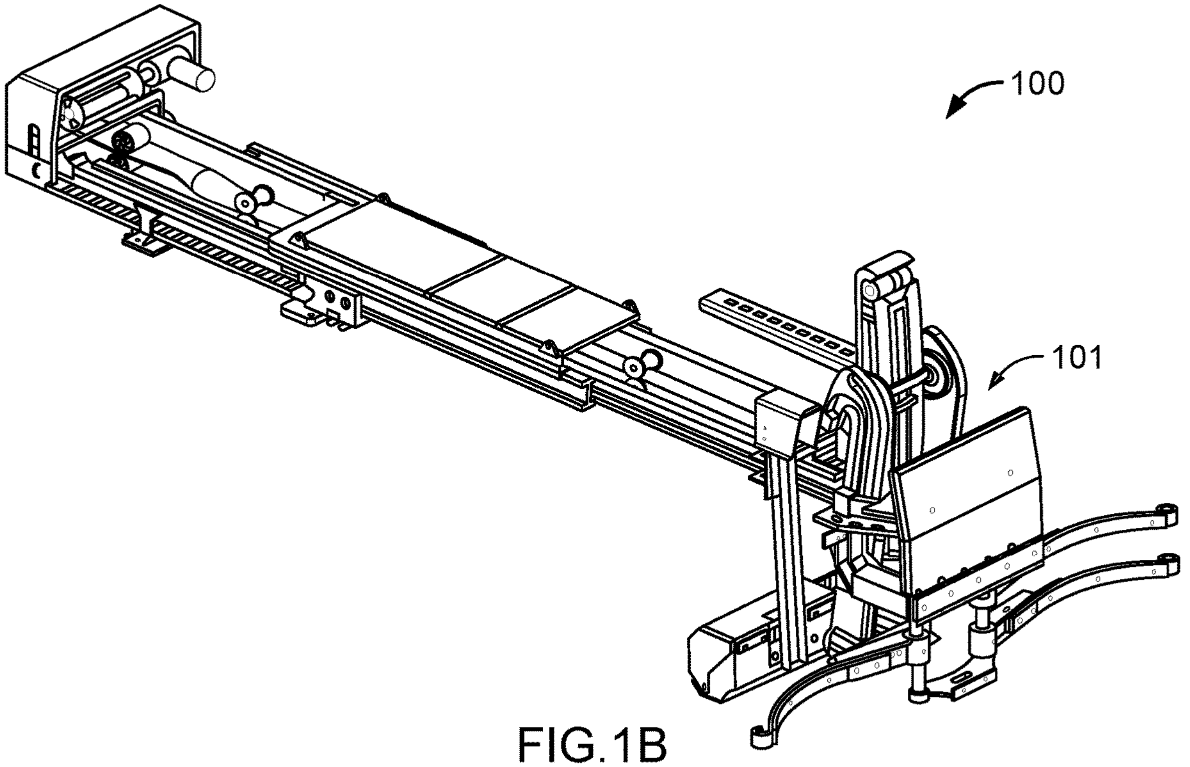
FIG. 1B is a perspective view of an example arm assembly coupled to a refuse container holder and shown in an extended position.
Figure 1C:
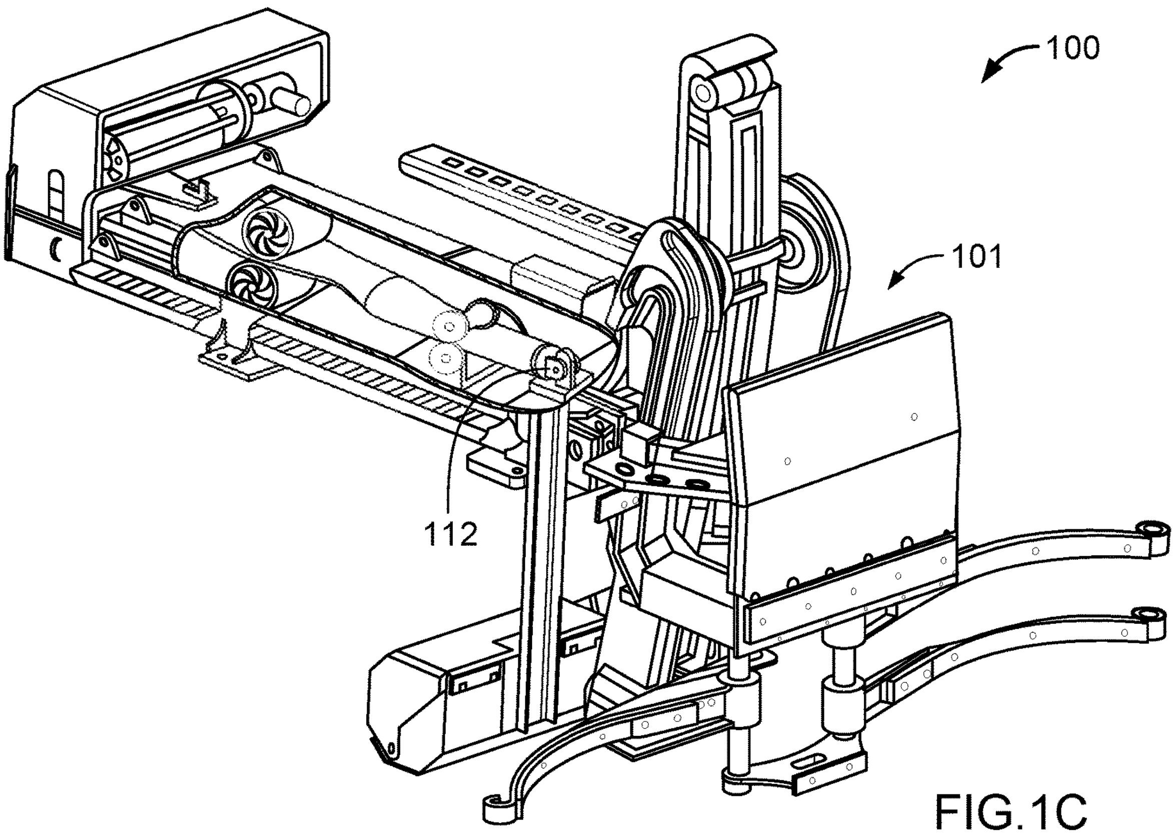
FIG. 1C is a perspective view of the arm assembly of FIG. 1A coupled to a refuse container holder and shown in a retracted position.

FIGS. 1B and 1C illustrate the example arm assembly 100 in an extended and retracted configuration, respectively. As previously mentioned, the arm assembly 100 is designed to move a refuse container, e.g., via a refuse container holder 101, from a location on one side of a side-loading refuse collection vehicle 2. For example, the refuse container holder 101 can be a grabber, as shown in FIGS. 1B and 1C. In some embodiments, the refuse container holder 101 is a tipper, a hook, or an articulated arm. The refuse container holder 101 is connected to the arm assembly 100 via the connector 112, as shown in FIG. 1C.

Figure 2:
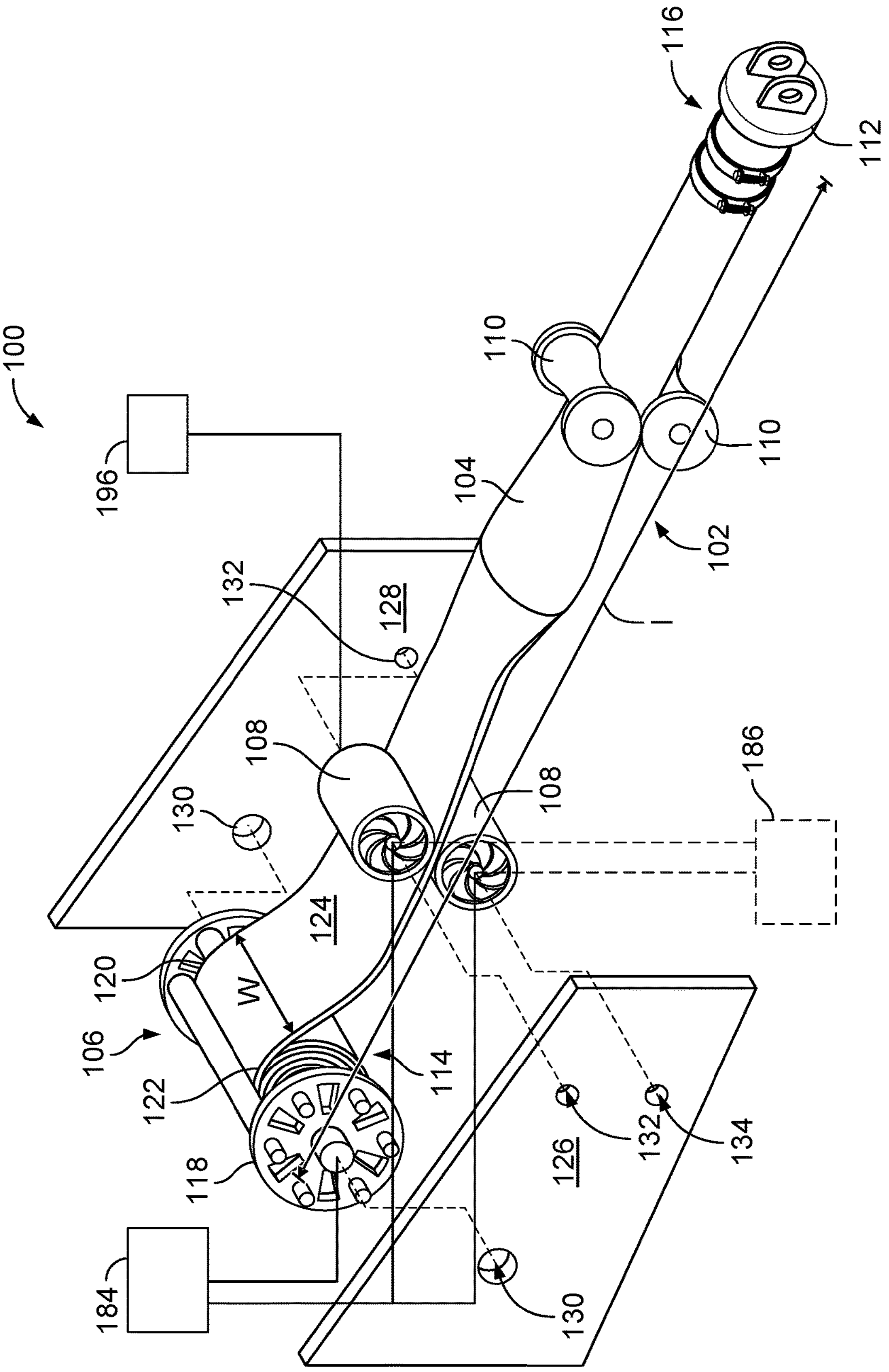
FIG. 2 is a perspective view of the arm assembly of FIGS. 1A and 1B.

Referring to FIG. 2, the arm assembly 100 includes a boom 102 configured to move the refuse container holder 101 relative to a chassis of the side-loading refuse collection vehicle 2 between an extended position and a retracted position. The boom 102 includes an extendable and retractable band 104, a drive box 106 rotatably mounted within the arm assembly 100, one or more drive rollers 108 configured to extend and retract the band 104, and one or more guide rollers 110 that guide and stabilize the band 104.

The boom 102 supports the refuse container holder and a load (e.g., a residential load, an industrial load, a commercial refuse container, a residential refuse container, a dumpster, or the like). The boom 102 also moves the refuse container holder and the load towards and away the drive box 106, on a side of the refuse collection vehicle, as the band 104 is retracted and extended. In some embodiments, the boom 102 can support a load having a weight ranging from about 500 pounds (lb) to about 1,500 lb (e.g., about 500 lb to about 600 lb, about 500 lb to about 700 lb, about 500 lb to about 800 lb, about 500 lb to about 900 lb, about 500 lb to about 1,000 lb, about 500 lb to about 1,100 lb, about 500 lb to about 1,200 lb, about 1,300 lb to about 700 lb, about 1,400 lb to about 1,500 lb, about 700 lb to about 1,000 lb, about 800 lb to about 1,000 lb, about 900 lb to about 1,000 lb, about 1,000 lb to about 1,100 lb, about 1,000 lb to about 1,200 lb, about 1,000 lb to about 1,300 lb, about 1,000 lb to about 1,400 lb, or about 1,000 lb to about 1,500 lb).

The band 104 includes a bistable material reversibly configurable between a stowed configuration and a deployed configuration. Bistable materials have two stable equilibrium states. In this example, the band 104 is formed from a resilient substrate that is pre-stressed to have a first stable equilibrium state (i.e., the stowed configuration) where the cross-section is flat, and a second stable equilibrium state (i.e., the deployed configured) where the cross-section is curved. In the first stable equilibrium state, the substrate of the band 104 is held in a coiled position. In the second stable equilibrium state, the substrate of the band 104 is uncoiled and assumes the shape of an elongate, longitudinal tube having a curved (e.g., circular) cross-section.

When the band 104 is deployed, the band 104 has a length "*l*" extending from a proximal end 114 to a distal end 116 of the band 104. In some embodiments, the deployed band 104 has a length of about 6 ft to about 12 ft. The band 104 has a width "w" extending from a first edge 120 to a second edge 122 of the band 104 and extending perpendicularly with respect to the length. In some embodiments, the band 104 has a width of about 4 in to about 12 in.

In the stowed configuration, the band 104 is coiled around the drive box 106 in a flattened form along its width, as shown near the proximal end 114 of the boom 102 in FIG. 2. In the deployed configuration, the band 104 is uncoiled, extending laterally away from the drive box 106. The deployed band 104 is in a curved form along its width, having a curved (e.g., circular) cross-section, as shown near the distal end 116 of the boom 102 in FIG. 2. The first and second edges 120, 122 of the band 104 can curve downward, as shown in FIG. 2, or can alternatively curve upward. In this example, when curving downward, the top surface 124 of the band 104 curves into an outer surface of the elongate, longitudinal tube. When curving upward, the top surface 124 of the band 104 becomes an inner surface of the elongate, longitudinal tube.

Figure 5A:
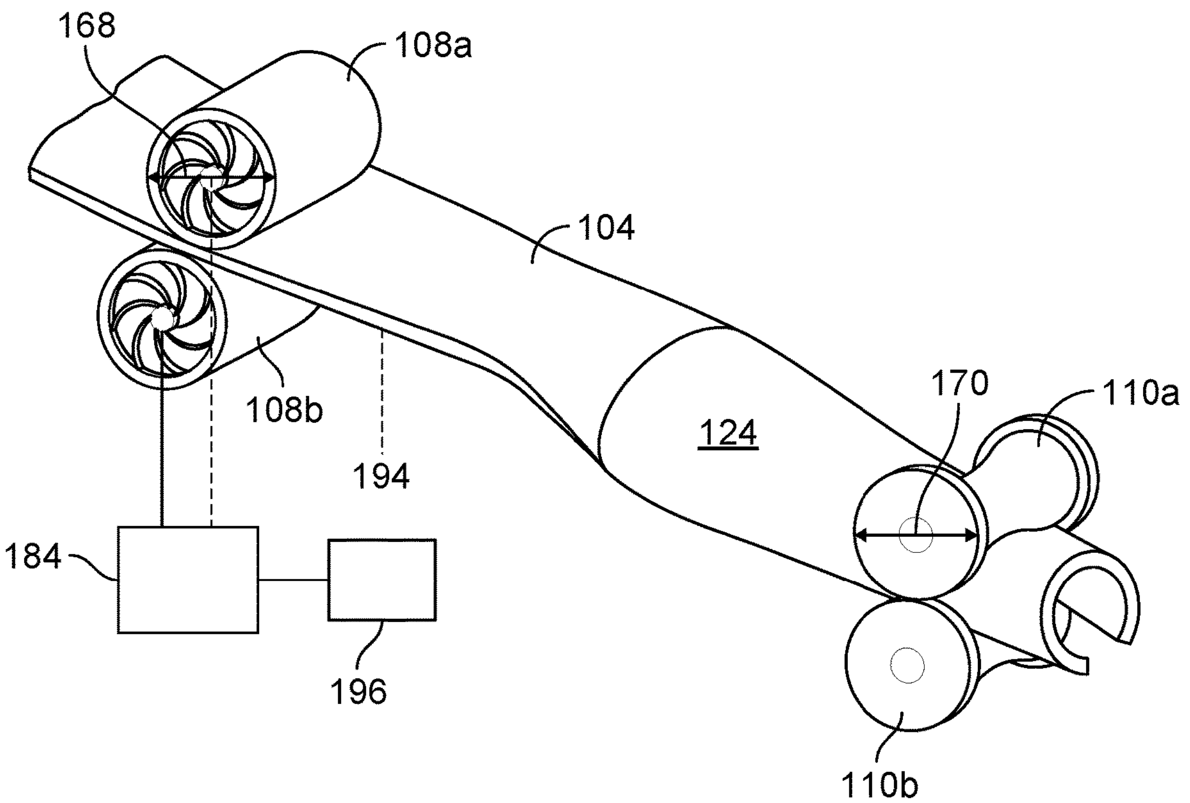
FIG. 5A is a perspective view of a boom of the arm assembly of FIG. 2.
Figure 5B:
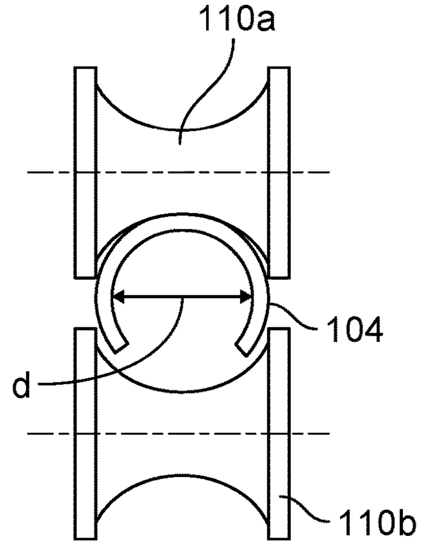
FIG. 5B is a front view of a boom of the arm assembly of FIG. 2.

In some examples, the first and second edges 120, 122 do not contact each other when the band 104 is curved in the deployed configuration (see, e.g., FIG. 5B). Alternatively, the first and second edges 120, 122 may contact and/or overlap each other. In some embodiments, the arm assembly further includes shielding to prevent refuse material from entering into the band 104 if the band 104 curves upward and the first and second edges 120, 122 do not contact each other when the band 104 is in the deployed configuration. In some examples, the arm assembly includes one or more shielding plates that are positioned above the band 104 to prevent refuse material from contacting the band 104. One advantage to the downward curving configuration is that refuse is less likely to enter and be retained within the tubular structure of the deployed band.

The band 104 can be composed of any bistable material of suitable mechanical characteristics and implementation-specific geometry. Suitable bistable materials include a resilient composite material and a plurality of reinforcement fibers that can be disposed within the composite material. Alternatively, the plurality of prestressed fibers may be embedded or disposed in a polymeric matrix within the composite material. The composite material can include any suitable resin system, such as a thermoplastic or thermosetting resin for example. Exemplary resins include epoxy, polyimide, polyamide, bismaleimide, polyester, vinyl ester, phenolic, polyether ether ketone (PEEK), polyether ketone (PEK), polyphenylene sulfide (PPS), and the like.

The plurality of reinforcement fibers can include fibers including, but not limited to, one or more of carbon, graphite, glass, an aromatic polyamide (e.g., "aramid") material, a variant of an aromatic polyamide material (e.g., a polyparaphenylene terephthalamide material, such as Kevlar® (by E. I. du Pont de Nemours and Company of Richmond, Va.), or the like. The scope of the present disclosure, however, encompasses fibers including any suitable material or combination of materials.

In some examples, the composite material can include a plurality of prestressed and/or tensioned bands in place of reinforcement fibers. The plurality of prestressed and/or tensioned bands can be composed of rubber or graphite. The plurality of reinforcement fibers, prestressed fibers, and/or tensioned bands may be oriented in one or more directions and may be woven or unwoven. It should be appreciated that band 104 may alternatively only include fibers arranged in a single direction, such as a uniaxial or helical fiber configurations. In yet another embodiment, the band 104 includes a first ply including fibers and a second ply including fibers, such that the second ply is laid-up over the first ply. In some embodiments, the plurality of reinforcement fibers is a plurality of longitudinally-extending, prestressed fibers.

The drive box 106 holds the coiled band 104 when the band 104 is in the stowed configuration. The drive box 106 includes a spool 118, the drive rollers 108, and a tensioner 196 attached to one of the drive rollers. The spool 118 can be a free-rotating spool or a drive spool. The drive spool can be an electrically-driven spool or a hydraulically-driven spool. For example, the refuse collection vehicle can further include a motor 184 (e.g., an electric motor or a hydraulic motor) that is operatively coupled to the spool 118 and configured to drive the spool 118. In some embodiments, the arm assembly 100 may be particularly advantageous in the context of an electrically-powered refuse collection vehicle because the spool 118 is amenable to be driven with an electric motor.

The drive rollers 108 are in contact with the band 104 and are configured to extend and retract the band relative to the drive box 106, thereby causing the band 104 to change from the stowed configuration to the deployed configuration. The drive rollers 108 can also be electrically-driven or hydraulically driven. For example, the arm assembly 100 can further include a motor (e.g., an electric motor or a hydraulic motor) that is operatively coupled to the drive rollers 108 and configured to drive at least one drive roller 108. In some embodiments, the arm assembly 100 may be particularly advantageous in the context of an electrically-powered refuse collection vehicle because the drive rollers 108 are amenable to be driven with an electric motor. The refuse collection vehicle can include a single motor 184 to actuate both the spool 118 and at least one drive roller 108. Alternatively, the refuse collection vehicle can include at least two motors: motor 184 can actuate the spool 118 and motor 186 can actuate at least one drive roller 108. The arm assembly 100 includes one or more guide rollers 110 that are configured to guide and stabilize the band 104 in the deployed configuration. In some embodiments, the guide rollers 110 may be configured to clean (e.g., wipe or brush) the band 104 as it retracts to get refuse off of the surface of the band 104.

The arm assembly 100 further includes a first panel 126 and a second panel 128 that are part of a housing enclosing the drive box 106, drive rollers 108, and at least a portion of the band 104. Each of the first and second panels 126, 128 define a first hole 130, a second hole 132, and a third hole 134 that help secure the spool 118 and driver rollers 108 to the first and second panels, 126, 128. In some embodiments, the first and second panels 126, 128 prevent refuse from contacting the band 104 and carriage support 136 while in use.

Figure 3A:
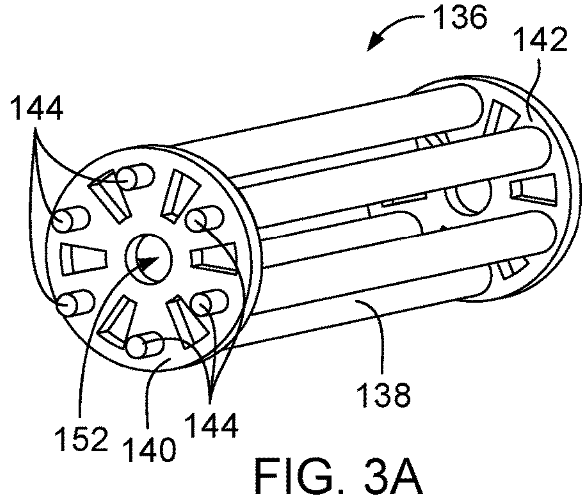
FIG. 3A is a perspective view of a carriage support of the arm assembly of FIG. 2.
Figure 3B:
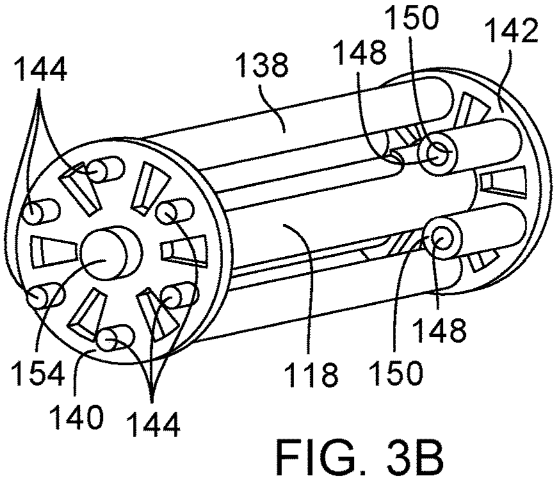
FIG. 3B is a perspective view of the carriage support of FIG. 3A except the guide rods have been removed to show the spool more clearly.
Figure 3C:
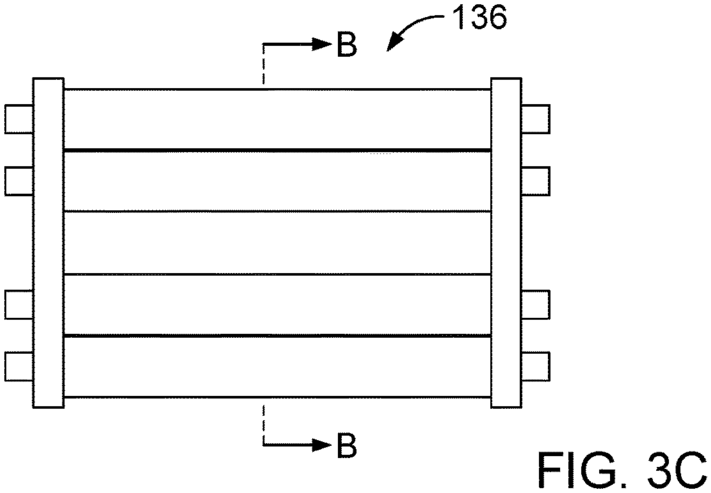
FIG. 3C is a top view of the spool.
Figure 3D:
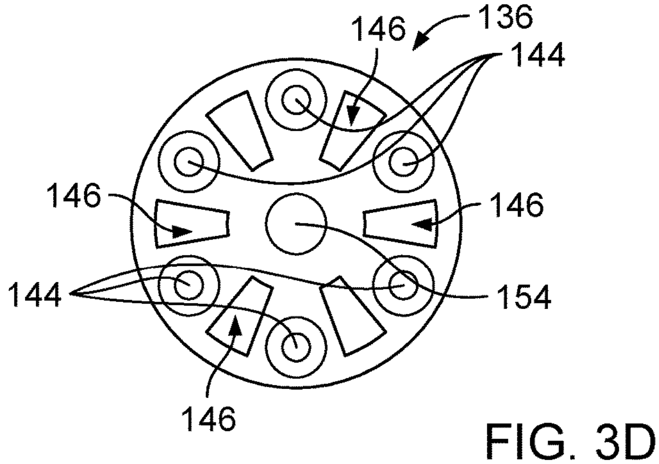
FIG. 3D is a cut-away view of the spool along the line marked B-B in FIG. 3C.

Referring to FIGS. 3A-3D, the spool 118 is fixedly attached to a carriage support 136 that secures the spool 118 to the first and second panels 126, 128 of the drive box 106. The carriage support 136 includes a plurality of guide rods 138 configured to guide the band 104 as it is extended from, retracted towards, and wound on the spool 118. Referring specifically to FIG. 3B, portions of the guide rods 138 are omitted to provide a clearer view of the spool 118. The carriage support 136 has a pair of opposing plates: a first plate 140 and a second plate 142. The first and second plates 140, 142 are circular in shape and define a plurality of holes that receive and secure the ends 144 of the guide rods 138. Each of first and second plates 140, 142 further defines a central hole 152 positioned at the center of each of the first and second plates 140, 142 and configured to receive and secure a shaft 154. The first and second plates 140, 142 further define holes 146. The ends 144 of the plurality of guide rods 138 are arranged radially and positioned symmetrically with respect to the central holes 152 or the center of each of the first and second plates 140, 142. The holes 146 are similarly arranged radially and positioned symmetrically with respect to the central holes 152 or the center of each of the first and second plates 140, 142. Furthermore, each of the holes 146 is arranged between a pair of ends 144 on each of the first and second plates 140, 142 (i.e., the holes 146 are intercalated between the ends 144).

The plurality of guide rods 138 along with the shaft 154 of the spool 118 extend between the inner surfaces of the first and second plates 140, 142. The first and second plates 140, 142 are typically composed of one or more materials, such as metal (e.g., steel). Referring particularly to FIG. 3B, each of the plurality of guide rods 138 includes a shaft 148, which is surrounded by a spacer 150. The spacer 150 is substantially cylindrical in shape and defines a hollow, elongated, tubular conduit, which is configured to receive the shaft 148. The shaft 148 is typically composed of one or more materials, such as metal (e.g., steel). The spacer 150 is typically composed of one or more materials, such as a plastic. In some embodiments, the composition of the guide rods 138 advantageously prevents wear on the guide rods 138 and the band 104.

Figure 4A:
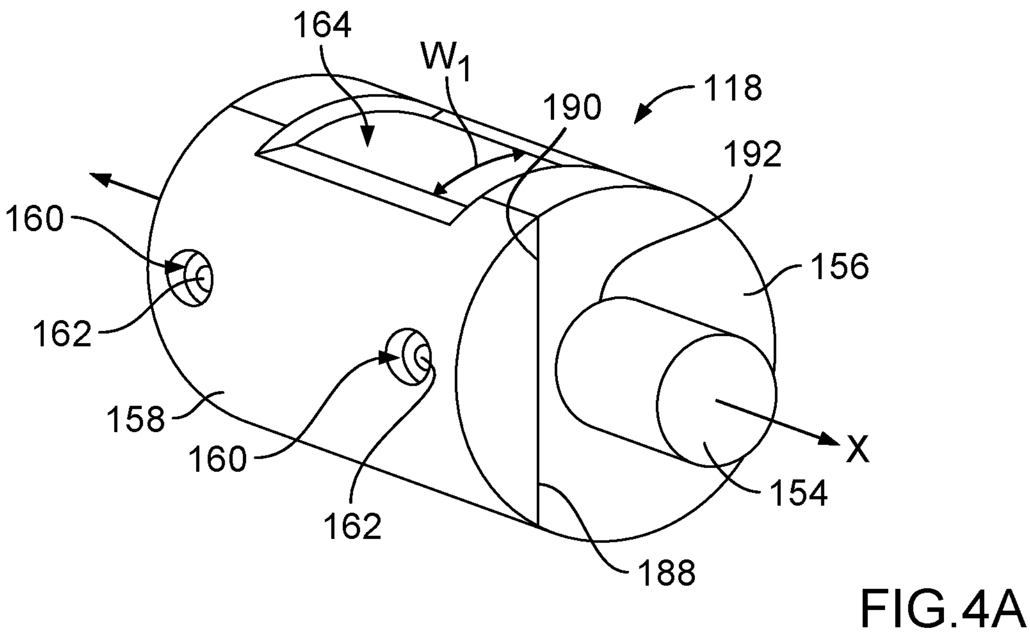
FIG. 4A is a perspective, rear view of the spool of the arm assembly of FIG. 2.
Figure 4B:
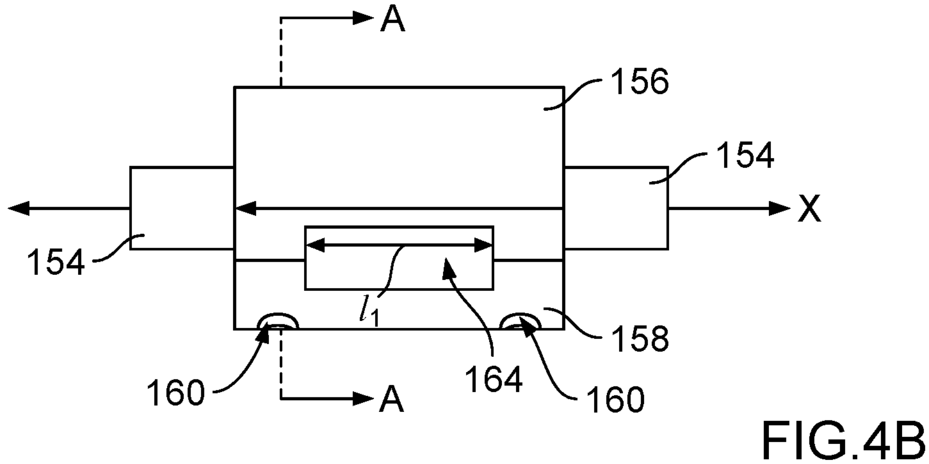
FIG. 4B is a top view of the spool of the arm assembly of FIG. 2.
Figure 4C:
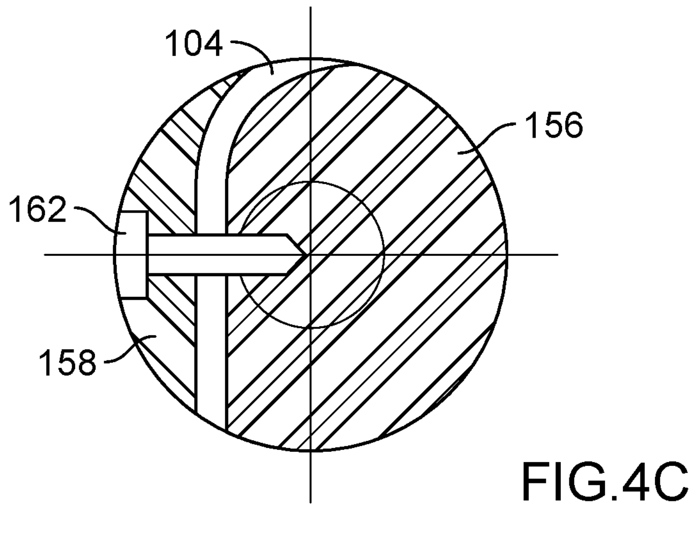
FIG. 4C is a cut-away view of the spool along the line marked A-A in FIG. 4C.

Referring to FIGS. 4A-4C, the spool 118 includes a housing 156 and a cover 158 that are configured to clamp the band 104 at the proximal end 114. The housing 156 and cover 158 are complementarily shaped such that they form a single structure when they are aligned and securely attached to each other. The housing 156 has the shape of a partial cylinder and comprises a longitudinal wall 188 that extends parallel to a longitudinal axis X. The wall 188 of the housing 156 contacts a corresponding longitudinal wall 190 of the cover 158 when the housing 156 and cover 158 are attached. The housing defines a channel 192 that is coaxial with the longitudinal axis X and is configured to rotatably receive the shaft 154. The spool 118, in turn, is configured to rotate about the longitudinal axis X when the shaft 154 is affixed to the first and second panels 126, 128 of the arm assembly 100.

The cover 158 is has the shape of a partial cylinder and, as mentioned above, comprises a longitudinal wall 190 that is parallel to a longitudinal axis X and configured to contact the longitudinal wall 188 of the housing 156. The cover 158 further defines a pair of through-holes 160, which extend from an outer surface 166 of the cover 158 to the longitudinal wall 190. When assembled and securely attached to each other, the cover 158 and the housing 156 together form a slot 164 that is configured to receive a proximal end of the band 104. The slot 164 has a length "$l_1$" that is parallel to the longitudinal axis X and is disposed at the interface of the longitudinal walls 188, 190 of the housing 156 and of the cover 158. The slot 164 is elongated and sized to receive the band 104. The slot 164 has a width "$w_1$" that is less than and perpendicular to its length "$l_1$". The band 104 is inserted into the slot 164 and moved down until it covers each through-hole 160. The pair of through-holes 160 is configured to receive a fastener 162 that fixedly secures the cover 158, band 104, and housing 156 to each other, as shown in FIG. 4C. The housing 156 and cover 158 are typically composed of one or more materials, such as metal (e.g., steel) or plastic (e.g., a molded plastic).

FIGS. 5A and 5B illustrate a magnified view of the band 104 in contact with a first drive roller 108*a*, a second drive roller 108*b*, and the guide rollers 110*a*, 110*b*. The first drive roller 108*a* is positioned above and is in contact with the top surface 124 of the band 104 in a flattened state. The second drive roller 108*b* is positioned below and is in contact with a bottom surface 194 of the band 104 in a flattened state. As mentioned above, the drive rollers 108 are configured to drive extend and retract the band 104 by providing a force to move the band 104 linearly in and out relative to the drive box 106 under a load. At least one of the drive rollers 108 is configured to be motorized, and the arm assembly further includes the motor 184 and a drive unit 196 (e.g., a gear box) configured to control the drive rollers 108. The drive unit 196 is operatively connected to the motor 184 and is configured to control an operating behavior (e.g., speed, torque, or the like) of the motor 184. Having at least one drive roller 108 motorized can serve to create a friction force between the first and second drive rollers 108*a*, 108*b* and the band 104 to help drive and extend the band 104. In some examples, the second drive roller 108*b* is driven or motorized (e.g., electrically driven or hydraulically driven), and the first driver roller 108*a* is not driven or motorized. In some examples, the second drive roller 108*b* is driven or motorized (e.g., electrically driven or hydraulically driven), and the first driver roller 108*a* is not driven or motorized. Alternatively, in some embodiments, the second drive roller 108*b* is not driven or motorized, and the first driver roller 108*a* is driven or motorized (e.g., electrically driven or hydraulically driven). In yet another example, neither of the first and second drive rollers 108*a*, 108*b* are motorized, and instead, only the band 104 is driven by a motorized spool 118. In some embodiments, the driver roller that is not driven or motorized is configured to be moved vertically to exert tension on the band 104.

The first and second drive rollers 108*a*, 108*b* are cylindrical in shape, have a smooth surface, and can be composed of any suitable materials including, but not limited to, a plastic (e.g., polyurethane). The first and second drive rollers 108*a*, 108*b* have a diameter 168 defining a curvature (e.g., curved surface) that matches or is about equivalent to a curvature of the band 104 in deployed configuration). In other words, the curvature of the drive rollers 108*a*, 108*b* is designed to be complementary to the curvature of the band 104 in the deployed configuration, such that the drive rollers 108*a*, 108*b* and the band 104 have a common tangent at the point of contact. The first and second drive rollers 108*a*, 108*b* are positioned distally away from the drive box and are proximally away from the guide rollers 110*a*, 110*b*. In some embodiments, the arm assembly can include more than a pair of drive rollers 108.

The arm assembly includes a pair of guide rollers 110*a*, 110*b* that are positioned distally away from the drive box and the first and second drive rollers 108*a*, 108*b*. Like the first and second drive rollers 108*a*, 108*b*, one of the guide rollers 110*a* is positioned above and in contact with the top surface 124 of the band 104 and the other guide roller 110*b* is positioned below the bottom surface 194 of the band 104. The guide rollers 110*a*, 110*b* contact the band 104 once it is in a deployed configuration and has formed an elongate, longitudinal tube having a curved cross-section. As mentioned above, the guide rollers 110*a*, 110*b* are configured to contact the band 104 and maintain it in the deployed configuration when under compressive loading that might otherwise flatten the band. Additionally, the guide rollers 110*a*, 110*b* may prevent potential buckling of the band 104 during retraction. In some embodiments, the pair of guide rollers 110*a*, 110*b* are not motorized given that their function is solely to maintain the band 104 in a tubular structure during deployment. In some other embodiments, the guide rollers 110*a*, 110*b* may have multiple functions.

The guide rollers 110*a*, 110*b* are concave in shape and can be composed of any suitable flexible materials including, but not limited to, a plastic or rubber. In some embodiments, the arm assembly can include more than one pair of guide rollers 110*a*, 110*b*. Referring particularly to FIG. 5B, the guide rollers 110*a*, 110*b* have a diameter 170 that defines a curvature (e.g., curved surface) of the guide rollers 110*a*, 110*b* that is complementary to the curvature of the band 104 in the deployed configuration, such that the guide rollers 110*a*, 110*b* and the band 104 have a common tangent at the point of contact. This design can enable the guide rollers 110*a*, 110*b* to prevent buckling of the band 104.

In some embodiments, when the band 104 is deployed, the band 104 has an inner diameter "d" that can be about equivalent to the diameter 170 of the guide rollers 110*a*, 110*b*. In some embodiments, the band 104 has an inner diameter "d" that is greater than or less than the diameter 170 of the guide rollers 110*a*, 110*b*. In some embodiments, the band 104 has an inner diameter "d" that can be about equivalent to the diameter 168 of the drive rollers 108*a*, 108*b*. In some embodiments, the band 104 has an inner diameter "d" that is less than or greater than the diameter 168 of the drive rollers 108*a*, 108*b*.

In some embodiments, the diameter 168 of the drive rollers 108*a*, 108*b* is about equivalent to the diameter 170 of the guide rollers 110*a*, 110*b*. In some embodiments, the diameter 168 of the drive rollers 108*a*, 108*b* is not equivalent to the diameter 170 of the guide rollers 110*a*, 110*b*. In some embodiments, the diameter 168 of the drive rollers 108*a*, 108*b* is greater than the diameter 170 of the guide rollers 110*a*, 110*b*. In some embodiments, the diameter 168 of the drive rollers 108*a*, 108*b* is less than the diameter 170 of the guide rollers 110*a*, 110*b*.

Figure 6A:
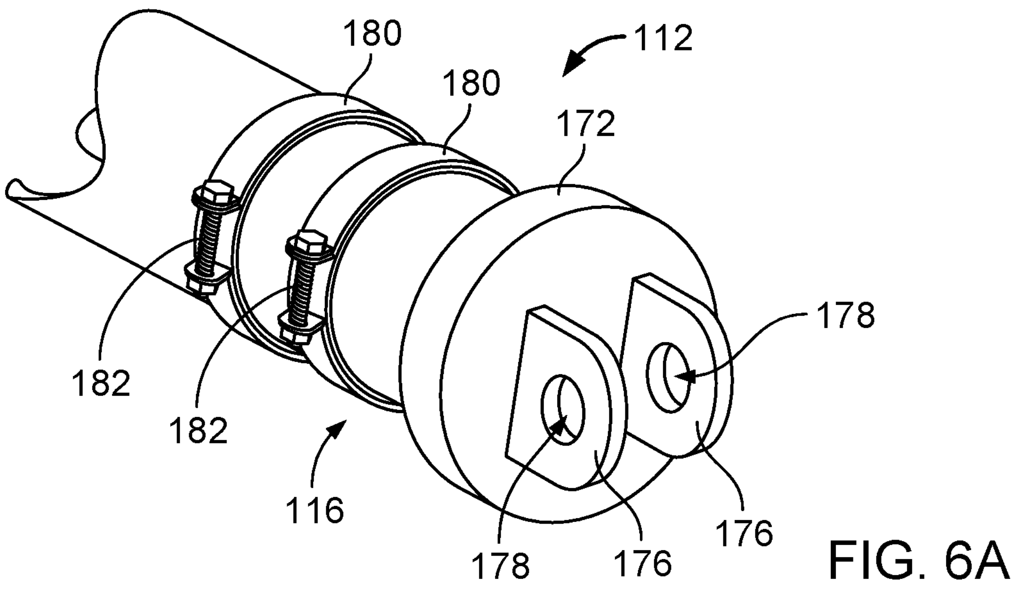
FIG. 6A is a perspective, front view of the connector of the arm assembly of FIG. 2.
Figure 6B:
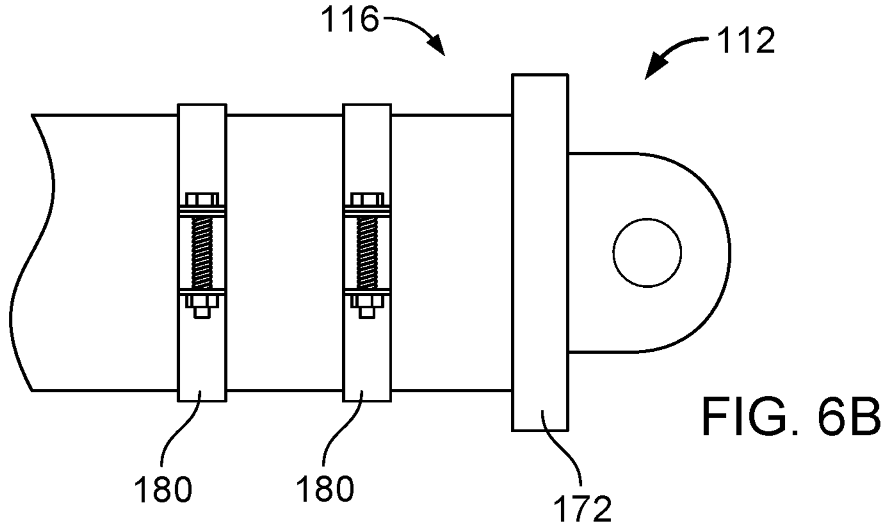
FIG. 6B is a top view of the connector of the arm assembly of FIG. 2.
Figure 6C:
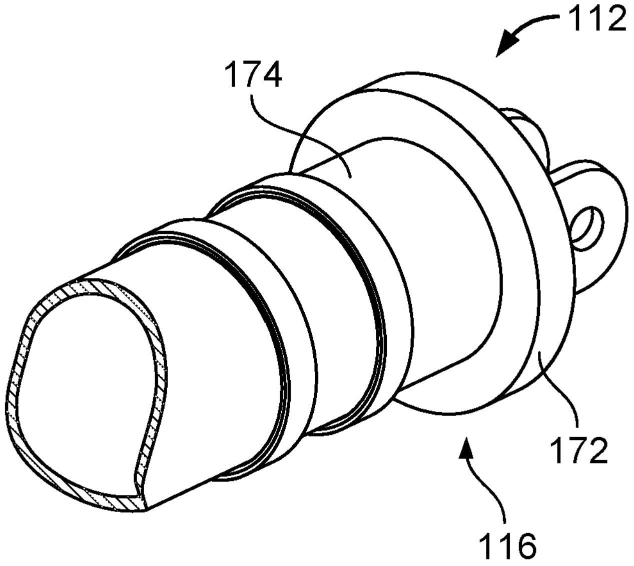
FIG. 6C is a perspective, rear view of the connector of the arm assembly of FIG. 2.

FIGS. 6A-6C illustrate a connector 112 secured to the distal end 116 of the band 104. The connector 112 is configured to connect the band 104 to a refuse container holder (e.g., a grabber, a tipper, a hook, an articulated arm, or the like). The connector 112 has a substantially circular base plate 172 that is integrally connected to a body 174. The body 174 is configured to be inserted into a cavity defined by the hollow, elongated, tubular structure of the band 104 in the deployed configuration. A pair of eye brackets 176 extend from a surface of the base plate 172 and each eye bracket 176 defines a hole 178 therethrough. The pair of eye brackets 176 are substantially semicircular in shape (e.g., include C-shaped protrusions). The eye brackets 176 are positioned parallel to each other such that both holes 178 are aligned. The pair of eye brackets 176 are configured to receive a connector of the refuse container holder. The body 174 of the connector 112 is secured to the band 104 with a pair of hose clamps 180 and fasteners 182 once the body 174 is inserted into the cavity defined by the hollow, elongated, tubular structure of the band 104 in the deployed configuration.

In some embodiments, the band 104 is part of a band actuator assembly that is configured to actuate one or more refuse collection vehicle components other than the refuse container holder. For example, in some embodiments, the band assembly can be used to actuate a hopper cover, which is configured to cover an opening of a hopper of a refuse collection vehicle. The band assembly can be configured to move the hopper cover between an open position and a closed position. For example, the band assembly can be operatively coupled to the hopper cover (e.g., a fabric, a metal panel, a plastic panel, or the like) and be configured to open and/or close the hopper cover by retracting and/or extending the band. In some embodiments, one, two, or more bands or band actuator assemblies are included in the refuse collection vehicle to actuate one or more refuse vehicle components (e.g., a hopper cover) other than the refuse container holder. In some embodiments, the band actuator assembly includes the band and one or more of the arm assembly components described above (e.g., one or more extendable and retractable bands, one or more guide rollers configured to guide and stabilize the band, one or more drive rollers configured to extend and retract the band, a drive box mounted within the band assembly, and the like).

Figure 7:
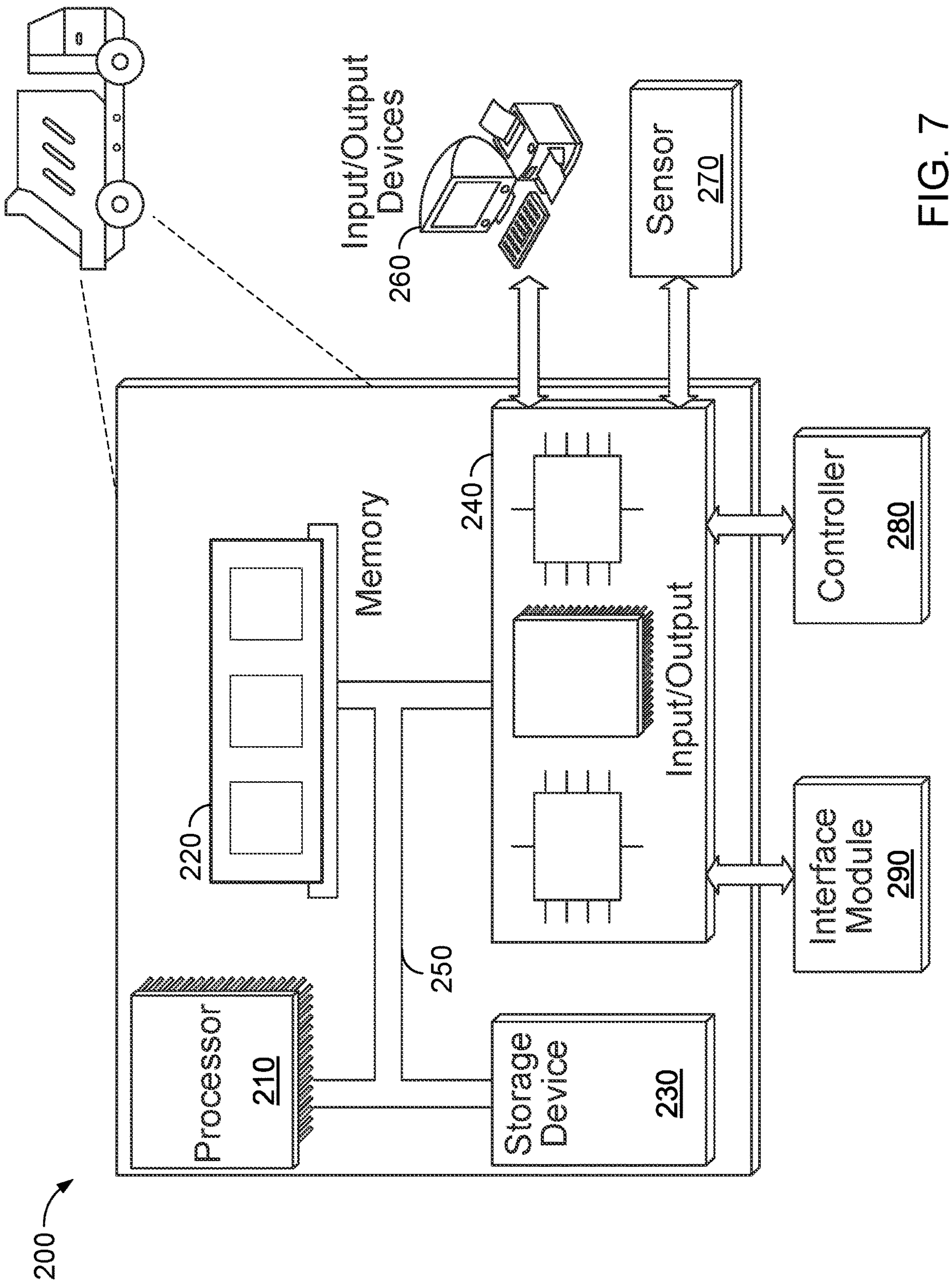
FIG. 7 is a block diagram of an example computer system.

In some embodiments, the refuse collection vehicle can further include a computer system 200. FIG. 7 is a block diagram of an example computer system 200. The computer system 200 includes a processor 210, a memory 220, a storage device 230, and one or more input/output interface devices 240. Each of the components 210, 220, 230, and 240 can be interconnected, for example, using a system bus 250.

The processor 210 is capable of processing instructions for execution within the computer system 200. The term "execution," as used here, refers to a technique in which program code causes a processor to carry out one or more processor instructions. In some embodiments, the processor 210 is a single-threaded processor. In some embodiments, the processor 210 is a multi-threaded processor. The processor 210 is capable of processing instructions stored in the memory 220 or on the storage device 230.

The processor 210 may execute operations such as actuating one or more components of the arm assembly 100. In some embodiments, the processor 210 may execute operations to calculate an extension length of the band 104 in the deployed configuration or while it is being extended, and based on the extension length, the processor 210 may execute operations to determine a position of the band 104. In some examples, the processor 210 may execute operations to determine a weight of a refuse container, and based on the determined weight of the refuse container, the processor may execute operations to control the speed at which the band 104 is deployed or retracted. In other words, the processor 210 may execute operations to control the motor(s) actuating the drive box 106 and/or drive rollers 108 based on the determined weight of the refuse container. In some embodiments, the processor 210 may execute operations to generate, store, and execute pre-programmed dump cycles that define pre-determined position sequences of the arm assembly 100. For example, a refuse collection vehicle operator can simply launch a pre-programmed dump sequence to automatically begin a dump cycle for a particular size of refuse container.

The memory 220 stores information within the computer system 200. In some implementations, the memory 220 is a computer-readable medium. In some implementations, the memory 220 is a volatile memory unit. In some implementations, the memory 220 is a non-volatile memory unit.

The storage device 230 is capable of providing mass storage for the computer system 200. In some implementations, the storage device 230 is a non-transitory computer-readable medium. In various different implementations, the storage device 230 can include, for example, a hard disk device, an optical disk device, a solid-state drive, a flash drive, magnetic tape, or some other large capacity storage device. In some implementations, the storage device 230 may be a cloud storage device, e.g., a logical storage device including one or more physical storage devices distributed on a network and accessed using a network. In some examples, the storage device may store long-term data, such as position data of the boom 102, rotation data of the spool 118, rotation data of the drive rollers 108, rotation data of the guide rollers 110, weight data of a refuse container, height data of the boom 102; extension distance of the boom 102, and/or rotation angle data of the boom 102.

The input/output interface devices 240 provide input/output operations for the computer system 200. In some implementations, the input/output interface devices 240 can include one or more of a network interface device, e.g., an Ethernet interface, a serial communication device, e.g., an RS-232 interface, and/or a wireless interface device, e.g., an 802.11 interface, a 3G wireless modem, a 4G wireless modem, etc. A network interface device allows the computer system 200 to communicate, for example, transmit and receive data such as position data of the boom 102, rotation data of the spool 118, rotation data of the drive rollers 108, rotation data of the guide rollers 110, weight data of a refuse container, height data of the boom 102; extension distance of the boom 102, and/or rotation angle data of the boom 102. In some implementations, the input/output interface devices 240 can include driver devices configured to receive input data and send output data to other input/output devices, for example, keyboard, printer, and display devices 260, a sensor 270, a controller 280, and/or an interface module 290. In some implementations, mobile computing devices, mobile communication devices, and other devices can be used as input/output devices.

In some embodiments, the refuse collection vehicle or the boom 102 of the disclosure can include one or more sensors 270 that are configured to detect a position of the band 104. In some embodiments, the one or more sensors 270 can be position sensors. In some embodiments, the position sensors are optical sensors (e.g., a camera). In some embodiments, the position sensors are configured to digitally measure a position of the band 104. In some embodiments, the position sensor is an encoder disposed on one of the drive rollers and is configured to detect an extension length of the band 104 in the deployed configuration or as it is being deployed. In some embodiments, the boom 102 can also include any number of regularly spaced features such as, but not limited to, retroreflective dots, magnets, and a segmented ferrous strip. The position sensor can then be configured to detect any one of these regularly spaced features to detect a position and/or an extension length of the band 104. For example, if each feature was spaced at 2 in, and the band 104 was extended for 10 regularly spaced features, then retracted 2 regularly spaced features, the position sensor would output an extension length of 20 inches (in.) out, followed by a retraction length of 4 in., and a processor would then be configured to compare the extension and retraction length and calculate the position of the band 104, which would correspond to a net extension length of 16 in.

In some embodiments, the position sensor is an ultrasonic sensor or a laser-based sensor that is configured to measure a distance from a proximal surface (e.g., of a drive roller or a guide roller) to a distal surface at the distal end 116 of the band 104.

The position sensors may enable proper positioning of the boom 102 as it extends laterally away from the drive box 106 and as it is being retracted towards the drive box 106. The position sensors may also enable proper positioning of the refuse container holder on a refuse container prior to a dump sequence, for example.

In some embodiments, the refuse collection vehicle of the disclosure can include one or more sensors 270 that are rotation sensors. The rotation sensors can be configured to count the number of rotations of the drive rollers 108, the guide rollers 110, and/or the spool 118. The rotation sensors can be positioned in/on the enclosure. The rotation sensors can be operatively coupled to a shaft. In some embodiments, the rotation sensors can enable a determination of an extension length of the band 104 while it is being deployed or in the deployed configuration.

In some embodiments, the refuse collection vehicle of the disclosure can include the controller 280. In some embodiments, the controller 280 is a motion controller that controls the movement of the boom 102. In some cases, the controller 280 is an interlock controller that stops movement of the boom 102 when sensor feedback indicates that undesired physical contact of the boom 102 (e.g., with an object on a road) is imminent. In some embodiments, the input/output interface devices 240 provide input/output operations for the computer system 200 based on the input/output data of the controller 280. These input/output operations can include, but are not limited to, controlling a movement of the arm assembly 100 in accordance with the operator input and/or sensor feedback.

In some embodiments, the refuse collection vehicle further includes one or more interface modules 290 that are operatively connected to the computer system 200 (e.g., to the input/output interface devices 240). In some embodiments, the one or more interface modules 290 are microprocessor-based interface modules. In some embodiments, the one or more interface modules 290 are switches or indicators that provide visual and/or auditory feedback to the refuse collection vehicle operator.

Computer program modules or software can be realized by instructions that upon execution cause one or more processing devices to carry out the processes and functions described above, for example, actuating the arm assembly 100 (e.g., actuating the drive box 106 and/or drive rollers 108), calculating an extension length of the band 104, determining a position of the band 104, determining a weight of a refuse container, and/or controlling the speed at which the band 104 is deployed or retracted. Such instructions can include, for example, interpreted instructions such as script instructions, or executable code, or other instructions stored in a computer readable medium.

In some examples, the computer system 200 is contained within a single integrated circuit package. A computer system 200 of this kind, in which both a processor 210 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 240.

Although an example processing system has been described in FIG. 7, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media, and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

The use of the term "about," as used herein, refers to an amount that is near the stated amount by about 10% including increments therein. For example, "about" can mean a range including the particular value and ranging from 10% below that particular value and spanning to 10% above that particular value.

While the above-discussed arm assembly 100 has been described and illustrated with respect to certain dimensions, shapes, arrangements, configurations, material formulations, and methods, in some embodiments, an arm assembly that is otherwise substantially similar in construction and function to the arm assembly 100 may include one or more dimensions, shapes, arrangements, configurations, and/or materials formulations that are different from the ones discussed above or may be used with respect to methods that are modified as compared to the methods described above. For example, while the arm assembly 100 has been described and illustrated as including a boom 102 including a band 104, in some embodiments, an arm assembly that is otherwise substantially similar in construction and function to the arm assembly 100 may alternatively include two or more overlapping bands that are nested within each other. In some embodiments, the two or more bands have opposite curvatures, thereby increasing the available compressive strength when fully extended in the deployed configuration.

While the boom 102 has been described and illustrated as configured to support a load, in some embodiments, a boom that is otherwise substantially similar in construction and function to the boom 102 is not configured to support a load on its own. For example, in some embodiments, the arm assembly further includes a structure that is configured to support the load, and the boom is only configured to move a cargo distally away from or towards the drive box 106.

While the drive rollers 108 have been described and illustrated as having a substantially cylindrical shape and smooth surface, in some embodiments, a drive roller that is otherwise substantially similar in construction and function to the drive rollers 108 may include cogs, which fit into notches that are defined on the edges of the band such that the cogs are configured to engage with the notches to drive the band during extension and retraction.

While the arm assembly 100 has been described and illustrated as having a pair of guide rollers 110*a*, 110*b*, in some embodiments, an arm assembly that is otherwise substantially similar in construction and function to the arm assembly 100 may not include the pair of guide rollers 110*a*, 110*b*, and instead, may include a tube with an inner diameter that nearly matches the outer diameter of the band 104 when in the deployed configuration. In some embodiments, the tube may be oversized such that it only contacts and maintains the band in the deployed configuration when there is a compressive load that causes the band 104 (in the deployed configuration) to start to deform.

While the arm assembly 100 has been described and illustrated as being coupled to a refuse container holder 101 and as being configured to be used by a refuse vehicle, in some embodiments, an arm assembly that is otherwise substantially similar in construction and function to the arm assembly 100 may alternatively be coupled to a different structure and may be configured to be used by various devices and/or systems. For example, in some embodiments, the arm assembly may be configured to be coupled to a structure that is part of a gate, a hangar, and/or a garage door opener. In some embodiments, the arm assembly may be configured to be used in a space-constrained area where it may replace one or more multi-stage actuators or cumbersome linkages. In some embodiments, the arm assembly may be configured to be used in a space-constrained area where range of motion is limited by packaging traditional actuators (e.g. articulated robotic arms). In some embodiments, the arm assembly may be configured to be used for various material movement applications such as assembly line actions. For example, in some embodiments, the arm assembly may be configured to push one or more boxes off an assembly line, to pack material into one or more boxes, or to be coupled to or used in a scissor lift.

While the arm assembly 100 has been described and illustrated as having the spool 118 being coupled to a refuse container holder 101 at a proximal end and being coupled to the refuse container holder 101 at a distal end via connector 112, in some embodiments, an arm assembly that is otherwise substantially similar in construction and function to the arm assembly 100 may alternatively be coupled to a refuse container vehicle in a reverse configuration than what has been described above. For example, in some embodiments, the drive box or the spool of the arm assembly may be configured to be secured to or mounted on a refuse container holder positioned distally with respect to the refuse collection vehicle, and the band may be configured to be coupled to a side of the refuse collection vehicle (e.g., via a connector). Thus, the distal end 116 of the band, as described throughout the disclosure, would be positioned proximally with respect to the refuse collection vehicle. The retraction and extension of the band may proceed as described throughout the disclosure.

While the arm assembly 100 has been described and illustrated as one or more guide rollers 110 configured to contact and maintain the band 104 in the deployed configuration, in some embodiments, an arm assembly that is otherwise substantially similar in construction and function to the arm assembly 100 may alternatively further include a frame configured to support the one or more guide rollers and/or the band and configured to maintain the band in the deployed configuration. For example, in some embodiments, the frame extends along the length of the band and is configured to receive one or more guide rollers. In some embodiments, the frame is configured to be retracted and extended simultaneously with the band. The frame may include one or more nested structures that are configured to move between a retracted position and an extended position as the band is extended and/or retracted. The frame may be configured to be motorized and may be operatively connected to and actuated via any one of the motors disclosed herein. In some embodiments, the frame may contact a bottom surface of the band and may be positioned under the bottom surface of the band. In some embodiments, the frame may contact a top surface of the band and may be positioned over the top surface of the band. In some embodiments, the frame may contact both top and bottom surfaces of the band and may enclose the band along its length.

While a number of examples have been described for illustration purposes, the foregoing description is not intended to limit the scope of the invention, which is defined by the scope of the appended claims. There are and will be other examples and modifications within the scope of the following claims.

What is claimed is:

1. A refuse collection vehicle comprising:

a chassis;

a cab coupled to a first portion of the chassis;

a hopper coupled to a second portion of the chassis; and an arm assembly configured to move a refuse container from a location on one side of the refuse collection vehicle, the arm assembly comprising a refuse container holder and a boom configured to move the refuse container holder relative to the chassis between an extended position and a retracted position, the boom comprising:

a band comprising a bistable material reversibly configurable between a stowed configuration and a deployed configuration, wherein at least a portion of the band is in the deployed configuration when the refuse container holder is moved to the extended position by the boom; and one or more drive rollers configured to extend and retract the band relative to the refuse collection vehicle, thereby causing the band to change from the stowed configuration to the deployed configuration;

wherein the arm assembly comprises a motor operatively coupled to the one or more drive rollers, the motor configured to drive the one or more drive rollers, wherein the motor is an electric motor or a hydraulic motor; and wherein the motor is operatively coupled and configured to drive a drive box rotatably mounted within the arm assembly, the drive box configured to windably receive the band.

2. The refuse collection vehicle of claim 1, wherein the drive box comprises a free-rotating spool or a driven spool, and wherein the driven spool is an electrically-driven spool or a hydraulically-driven spool.

3. The refuse collection vehicle of claim 1, wherein the boom further comprises one or more guide rollers configured to contact and maintain the band in the deployed configuration, and wherein the one or more guide rollers have a concave shape.

4. The refuse collection vehicle of claim 1, wherein the band is coiled when in the stowed configuration, and wherein the band is uncoiled when in the deployed configuration.

5. The refuse collection vehicle of claim 1, wherein the boom supports a load having a weight ranging from about 500 pounds (lbs.) to about 1,500 lbs.

6. The refuse collection vehicle of claim 1, wherein the band has a length and a width, wherein the band, while in the stowed configuration, is in a flattened form along the width, and, while in the deployed configuration, is in a curved form along the width.

7. The refuse collection vehicle of claim 1, wherein the boom further comprises a connector secured to a distal end of the band, the connector configured to connect the band to the refuse container holder.

8. The refuse collection vehicle of claim 1, wherein the refuse container holder is a grabber, a tipper, a hook, or an articulated arm.

9. An arm assembly for a refuse collection vehicle, the arm assembly comprising:

a refuse container holder;

a boom configured to move the refuse container holder relative to the refuse collection vehicle between an extended position and a retracted position, the boom comprising:

a band comprising a bistable material reversibly configurable between a stowed configuration and a deployed configuration, wherein at least a portion of the band is in the deployed configuration when the refuse container holder is moved to the extended position by the boom; and one or more drive rollers configured to extend and retract the band relative to the refuse collection vehicle, thereby causing the band to change from the stowed configuration to the deployed configuration; and a motor operatively coupled to the one or more drive rollers, the motor configured to drive the one or more drive rollers, wherein the motor is an electric motor or a hydraulic motor;

wherein the motor is operatively coupled and configured to drive a drive box rotatably mounted within the arm assembly, the drive box configured to windably receive the band.

10. The arm assembly of claim 9, wherein the arm assembly is configured to move a refuse container from a location on one side of the refuse collection vehicle.

11. An arm assembly for a refuse collection vehicle, the arm assembly comprising:

a refuse container holder;

a boom configured to move the refuse container holder relative to the refuse collection vehicle between an extended position and a retracted position, the boom comprising:

a band comprising a bistable material reversibly configurable between a stowed configuration and a deployed configuration, wherein at least a portion of the band is in the deployed configuration when the refuse container holder is moved to the extended position by the boom; and one or more drive rollers configured to linearly extend and retract the band relative to the refuse collection vehicle, thereby causing the band to change from the stowed configuration to the deployed configuration; and a motor operatively coupled to the one or more drive rollers, the motor configured to drive the one or more drive rollers, wherein the motor is an electric motor or a hydraulic motor;

wherein the motor is operatively coupled and configured to drive a drive box rotatably mounted within the arm assembly, the drive box configured to windably receive the band.

12. An arm assembly for a refuse collection vehicle, the arm assembly comprising:

a refuse container holder;

a boom configured to move the refuse container holder relative to the refuse collection vehicle between an extended position and a retracted position, the boom comprising:

a band comprising a bistable material reversibly configurable between a stowed configuration and a deployed configuration, wherein at least a portion of the band is in the deployed configuration when the refuse container holder is moved to the extended position by the boom;

one or more guide rollers configured to contact and maintain the band in the deployed configuration; and one or more drive rollers configured to extend and retract the band relative to the refuse collection vehicle, thereby causing the band to change from the stowed configuration to the deployed configuration; and a motor operatively coupled to the one or more drive rollers, the motor configured to drive the one or more drive rollers, wherein the motor is an electric motor or a hydraulic motor;

wherein the motor is operatively coupled and configured to drive a drive box rotatably mounted within the arm assembly, the drive box configured to windably receive the band.

13. A band actuator, comprising:

a band comprising a bistable material reversibly configurable between a coiled configuration and an uncoiled configuration, the band having a length and a width, wherein the band, while in the coiled configuration, is in a flattened form along the width, and while in the uncoiled configuration, is in a curved form along the width;

a drive box rotatably mounted within the band actuator, the drive box configured to windably receive the band;

one or more drive rollers configured to linearly extend and retract the band relative to the drive box, thereby causing the band to change from the coiled configuration to the uncoiled configuration; and one or more guide rollers configured to contact and maintain the band in the curved form along the width while in the uncoiled configuration;

a motor operatively coupled to the one or more drive rollers, the motor configured to drive the one or more drive rollers, wherein the motor is an electric motor or a hydraulic motor;

wherein the motor is operatively coupled and configured to drive the drive box rotatably mounted within the band actuator.

14. The refuse collection vehicle of claim 3, wherein the one or more guide rollers comprise multiple guide rollers each having a concave surface facing the band.

15. The refuse collection vehicle of claim 3, wherein each of the one or more drive rollers has a respective diameter that is less than a respective diameter of each of the one or more guide rollers.

16. The refuse collection vehicle of claim 7, wherein the connector comprises a circular base plate that is integrally formed with a body that is configured to be inserted into a cavity defined by a hollow tubular structure formed by the band in the deployed configuration.

17. The refuse collection vehicle of claim 16, wherein the connector further comprises a pair of eye brackets that extend from a surface of the circular base plate, each eye bracket of the pair of eye brackets defining a respective hole therethrough.

18. The refuse collection vehicle of claim 17, wherein the pair of eye brackets are substantially semicircular in shape.

19. The refuse collection vehicle of claim 17, wherein each eye bracket of the pair of eye brackets are positioned parallel to each other such that the respective holes are aligned.

20. The refuse collection vehicle of claim 17, wherein the pair of eye brackets are configured to receive a connector of the refuse container holder, and wherein the body of the connector is secured to the band with hose clamps and fasteners.

* * * * *